US011215893B2

(12) United States Patent
Li et al.

(10) Patent No.: US 11,215,893 B2
(45) Date of Patent: Jan. 4, 2022

(54) ARRAY SUBSTRATE, METHOD FOR MANUFACTURING THE SAME, AND DISPLAY APPARATUS (71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Yunze Li, Beijing (CN); Ni Yang, Beijing (CN); Zhijian Qi, Beijing (CN); Xiaoyuan Wang, Beijing (CN); Shaoru Li, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

(*) Notice: Subject to any disclaimer, the term of this patent is extended or adjusted under 35 U.S.C. 154(b) by 511 days.

(21) Appl. No.: 16/304,737

(22) PCT Filed: Feb. 28, 2018

(86) PCT No.: PCT/CN2018/077561
§ 371 (c)(1),
(2) Date: Nov. 27, 2018

(87) PCT Pub. No.: WO2019/007086
PCT Pub. Date: Jan. 10, 2019

(65) Prior Publication Data
US 2021/0223654 A1    Jul. 22, 2021

(30) Foreign Application Priority Data
Jul. 4, 2017   (CN) .......................... 201710540286.6

(51) Int. Cl.
*G02F 1/1345*   (2006.01)
*G02F 1/1362*   (2006.01)

(52) U.S. Cl.
CPC ............................. *G02F 1/136295* (2021.01)

(58) Field of Classification Search
CPC ......... G02F 1/136295; G02F 1/134309; G02F 1/13458
See application file for complete search history.

(56) References Cited

U.S. PATENT DOCUMENTS 9,741,753 B2    8/2017 Gao et al.
2005/0072597 A1*  4/2005 Lee .................. G02F 1/13452
                                                        174/262

FOREIGN PATENT DOCUMENTS

CN         1928670 A    3/2007
CN      102655144 A    9/2012
(Continued)

OTHER PUBLICATIONS

PCT International Search Report, International Application No. PCT/CN2018/077561, dated May 16, 2018. 6 pages, with English translation.
(Continued)

*Primary Examiner* — Donald L Raleigh
(74) *Attorney, Agent, or Firm* — Armstrong Teasdale LLP (57) ABSTRACT

Embodiments of the present disclosure provide an array substrate, a method for manufacturing the same, and a display apparatus. The array substrate includes a plurality of pad structures located in a bonding region and a plurality of data leads located in a lead region. Each data lead corresponds to one pad structure. The pad structure includes at least two pad electrodes insulated from each other. In the pad structure, each pad electrode is electrically connected to the
(Continued)

data lead corresponding to the pad structure, respectively, to form different signal writing paths.

18 Claims, 7 Drawing Sheets

(56) References Cited

FOREIGN PATENT DOCUMENTS

| | | |
|---|---|---|
| CN | 105093729 A | 11/2015 |
| CN | 107121855 A | 9/2017 |
| TW | 200513766 A | 4/2005 |

OTHER PUBLICATIONS

Written Opinion, International Application No. PCT/CN2018/077561, dated May 16, 2018. 6 pages, with English translation of relevant section.
First Office Action, Chinese Application No. 201710540286.6, dated Nov. 5, 2018. 13 pages, with English translation.
China Second Office Action, Application No. 201710540286.6, dated May 21, 2019, 15 pps.: with English translation.

\* cited by examiner

ARRAY SUBSTRATE, METHOD FOR MANUFACTURING THE SAME, AND DISPLAY APPARATUS

CROSS REFERENCE TO RELATED APPLICATIONS

This patent application is a National Stage Entry of PCT/CN2018/077561 filed on Feb. 28, 2018, which claims the benefit and priority of Chinese Patent Application No. 201710540286.6 filed on Jul. 4, 2017, the disclosures of which are incorporated herein by reference in their entirety as part of the present application.

BACKGROUND

The present disclosure relates to the field of display technologies, and in particular, to an array substrate, a method for manufacturing the same, and a display apparatus.

As a flat panel display device, Thin Film Transistor Liquid Crystal Display (TFT-LCD) has advantages such as small size, low power consumption, no radiation, and relatively low manufacturing cost, and thus has been increasingly applied to the field of high performance display.

BRIEF DESCRIPTION

Embodiments of the present disclosure provide an array substrate, a method for manufacturing the same, and a display apparatus.

Embodiments of the present disclosure employ the following technical solutions.

One aspect of an embodiment of the present disclosure provides an array substrate. The array substrate includes a plurality of pad structures located in a bonding region and a plurality of data leads located in a lead region. Each data lead corresponds to one pad structure. The pad structure includes at least two pad electrodes insulated from each other. In the pad structure, each pad electrode is electrically connected to the data lead corresponding to the pad structure, respectively, to form different signal writing paths.

The array substrate may further include a base substrate, wherein the pad structure includes a first pad electrode and a second pad electrode sequentially disposed on the base substrate in a direction perpendicular to the base substrate and insulated from each other. The array substrate further includes a first insulating layer located between the first pad electrode and the second pad electrode, a second insulating layer covering the first insulating layer and the second pad electrode, a first via located in the first insulating layer and the second insulating layer and reaching the first pad electrode, and a second via located in the second insulating layer and reaching the second pad electrode, a first conductive electrode and a second conductive electrode located on the second insulating layer, wherein the first conductive electrode is electrically connected to the first pad electrode through the first via, and the second conductive electrode is electrically connected to the second pad electrode through the second via.

Further, an extending direction of the first pad electrode may be the same as an extending direction of the second pad electrode. An orthographic projection of the second pad electrode on the base substrate only overlaps with a portion, adjacent to the lead region, of an orthographic projection of the first pad electrode on the base substrate. One end of the first pad electrode and one end of the second pad electrode adjacent to the lead region are both electrically connected to the data lead.

Alternatively, an orthographic projection of the first pad electrode on the base substrate may not overlap with an orthographic projection of the second pad electrode on the base substrate. The first pad electrode includes a first sub-portion and a second sub-portion. The first sub-portion is located at one end of the second pad electrode facing away from the data lead. An extending direction of the first sub-portion is the same as the extending direction of the second pad electrode. The second sub-portion is located on a side of the second pad electrode in a direction perpendicular to the extending direction. One end of the second sub-portion is connected to the first sub-portion, and the other end of the second sub-portion is electrically connected to the data leads. One end of the second pad electrode adjacent to the lead region is electrically connected to the data lead.

The data lead may be formed in the same layer as the first pad electrode. The array substrate further includes a third via located in the first insulating layer and the second insulating layer and reaching a portion of the data lead adjacent to the bonding region. The second conductive electrode is also electrically connected to the data lead through the third via.

Alternatively, the data lead may include a first sub-electrode and a second sub-electrode that overlap with each other in a direction perpendicular to the base substrate. The first sub-electrode is formed in the same layer as the first pad electrode and is connected to the first pad electrode, and the second sub-electrode is formed in the same layer as the second pad electrode and is connected to the second pad electrode. The array substrate further includes a fourth via located in the first insulating layer and the second insulating layer and reaching a portion of the first sub-electrode away from the bonding region, a fifth via located in the second insulating layer and reaching a portion of the second sub-electrode away from the bonding region, and a third conductive electrode located on the second insulating layer, wherein the third conductive electrode electrically connects the first sub-electrode to the second sub-electrode through the fourth via and the fifth via.

Further, the lead region may include a proximal terminal region at a central position and a distal terminal region at both sides of the proximal terminal region. The data lead located in the proximal terminal region is a straight line extending in a first direction. A portion, adjacent to the bonding region, of the data lead located in the distal terminal region is a straight line extending in the first direction, and a portion of the data lead in the distal terminal region away from the bonding region is an oblique line inclined in a direction facing away from the proximal terminal region. The first direction is the same as an extending direction of a signal line connected to the data lead. A length of the second sub-electrode located in the proximal terminal region is smaller than a length of the second sub-electrode located in the distal terminal region.

The array substrate may further include a gate line and a data line. The gate line is formed in the same layer as the first pad electrode, and the data line is formed in the same layer as the second pad electrode.

The array substrate may further include a conductive protective layer covering the second conductive electrode, wherein an orthographic projection of the conductive protective layer on the base substrate overlap with an orthographic projection of the third via on the base substrate.

Another aspect of an embodiment of the present disclosure provides a display apparatus. The display apparatus includes the array substrate described in one aspect of an embodiment of the present disclosure.

Yet another aspect of an embodiment of the present disclosure provides a method for manufacturing an array substrate described in one aspect of an embodiment of the present disclosure. The method includes providing a base substrate including a bonding region and a lead region, forming a plurality of pad structures in the bonding region on the base substrate, wherein the pad structure includes at least two pad electrodes insulated from each other, forming a plurality of data leads in the lead region on the base substrate, wherein each data lead corresponds to one pad structure, and in the pad structure, each pad electrode is electrically connected to the data lead corresponding to the pad structure, respectively, to form different signal writing paths.

The method for forming the pad structure may include forming a first metal layer on the base substrate, patterning the first metal layer to form a first pad electrode, forming a first insulating layer to cover the base substrate and the first pad electrode, forming a second metal layer on the first insulating layer, patterning the second metal layer to form a second pad electrode, forming a second insulating layer to cover the first insulating layer and the second pad electrode, patterning the first insulating layer and the second insulating layer to form a second via reaching the second pad electrode and a first via reaching the first pad electrode, forming a conductive layer on the second insulating layer to fill the first via and the second via, patterning the conductive layer to form a first conductive electrode and a second conductive electrode, wherein the first conductive electrode is electrically connected to the first pad electrode through the first via, and the second conductive electrode is electrically connected to the second pad electrode through the second via.

Further, the method for forming the data lead may include forming the data lead formed in the same layer as the first pad electrode and connected to the first pad electrode while forming the first pad electrode, forming a third via reaching a portion of the data lead adjacent to the bonding region in the first insulating layer and the second insulating layer while forming the first via, wherein the second conductive electrode is also electrically connected to the data lead through the third via.

Further, the method for forming the data lead may include forming a first sub-electrode of the data lead formed in the same layer as the first pad electrode and connected to the first pad electrode while forming the first pad electrode, forming a second sub-electrode of the data lead formed in the same layer as the second pad electrode and connected to the second pad electrode while forming the second pad electrode, and forming a fourth via reaching a portion of the first sub-electrode away from the bonding region and a fifth via reaching a portion of the second sub-electrode away from the bonding region in the first insulating layer and the second insulating layer while forming the first via and the second via, forming a third conductive electrode on the second insulating layer while forming the first conductive electrode and the second conductive electrode, wherein the third conductive electrode electrically connects the first sub-electrode to the second sub-electrode through the fourth via and the fifth via. The first sub-electrode and the second sub-electrode constitute the data lead.

The method may further include forming a gate line and a data line in a display region of the array substrate. In the display region, the gate line is formed in the same layer as the first pad electrode while forming the first pad electrode, and in the display region, the data line is formed in the same layer as the second pad electrode while forming the second pad electrode.

BRIEF DESCRIPTION OF THE DRAWINGS

In order to more clearly illustrate the technical solutions in the embodiments of the present disclosure, the drawings to be used in the description of embodiments will be briefly described below. Obviously, the drawings in the following description are only a part of the embodiments of the present disclosure, and other drawings can be obtained for those skilled in the art without any inventive effort.

DETAILED DESCRIPTION

The technical solutions in the embodiments of the present disclosure are clearly and completely described in the following with reference to the drawings in the embodiments of the present disclosure. Obviously, the described embodiments are only a part of the embodiments of the present disclosure, and not all of the embodiments. All other embodiments obtained by those skilled in the art based on the embodiments of the present disclosure without any inventive effort belong to the scope protected by the present disclosure.

The TFT-LCD controls the electric field between the pixel electrode and the common electrode by bonding some driving chips to achieve the purpose of controlling the deflection angle of the liquid crystal molecules, so as to finally display the expected picture. In order to achieve the bonding of the driving chip, a pad electrode is usually formed in the bonding region of the array substrate of the TFT-LCD. The surface of the pad electrode is covered with an insulating layer or a transparent conductive layer. However, during the process of manufacturing, since the side angle of the pad electrode is too large, or the density of the transparent conductive layer is insufficient, a part of the pad electrode is exposed to the air, such that when the display panel works, a part of the pad electrode is electrochemically corroded under the electric field, thereby an Abnormal Display (AD) phenomenon, such as a bright line, a dark line, or a bad block, caused by an open circuit occurs. The defects caused by the above corrosion cannot be repaired, which seriously affects the product yield and increases the manufacturing cost.

Figure 1:
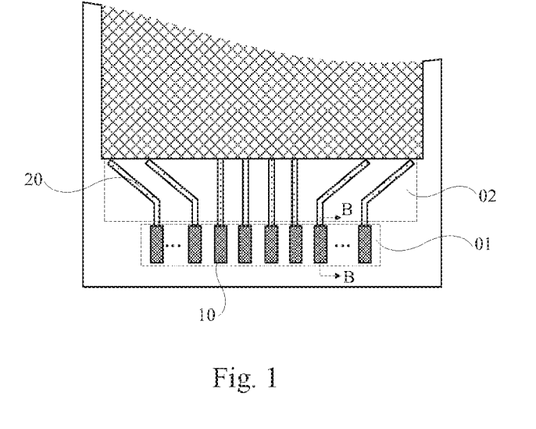
FIG. 1 is a schematic view of an array substrate according to an embodiment of the present disclosure.

Embodiments of the present disclosure provide an array substrate. As shown in FIG. 1, the array substrate includes a plurality of pad structures 10 in the bonding region 01, and a plurality of data leads 20 in the lead regions 02. Each data lead 20 corresponds to a pad structure 10.

It should be noted that the array substrate includes a display region provided with sub-pixels and a non-display region located around the display region. The bonding region 01 and the lead region 02 are located within the non-display region. The bonding region 01 is used to bond the driving chip. The driving chip may be, for example, a source driving chip that can provide a driving signal to the data line DATA, or may be a gate driving chip that can provide a driving signal to the gate GATE, or may be a touching chip that can provide a touching signal to a reading signal line in the array substrate, or, for an array substrate having a Gate Driver on Array (GOA) circuit, the above driving chip may be a chip used to provide a clock signal, the voltage source such as VSS, VDD, VGL, VGH, etc. to the GOA circuit, which is not limited in this disclosure.

Based on this, when the above driving chip is a source driving chip, the data lead 20 is used to connect the source driving chip to a data line (not shown) in the display region, or, when the above driving chip is a gate driving chip, the data lead 20 is used to connect the gate driving chip to a gate line (not shown) in the display region. In this case, the lead region 02 is located between the bonding region 01 and the display region. At this time, the data lead 20 can be referred to as a fan out lead. In this case, in addition to the above fan out leads, the other data leads 20 in the non-display region are referred to as a Propel Link Gate (PLG) wire. For example, when the driving chip is used to provide a clock signal or a voltage source to the GOA circuit, the PLG wire is used to connect the driving chip to the signal control terminal (e.g., the clock signal terminal, the voltage terminal) of each shift register unit in the GOA circuit.

Based on this, the pad structure 10 includes at least two pad electrodes insulated from each other. In the pad structure 10, each pad electrode is electrically connected to the data lead 20 corresponding to the pad structure 10 to constitute different signal writing paths. In this case, when one pad electrode is corroded and cannot be repaired and thus operates abnormally, the other pad electrode can still maintain the normal signal transmission between the pad structure 10 and the data lead 20, thereby improving the quality of the array substrate, reducing the risk of substrate defects and manufacturing costs.

Figure 2:
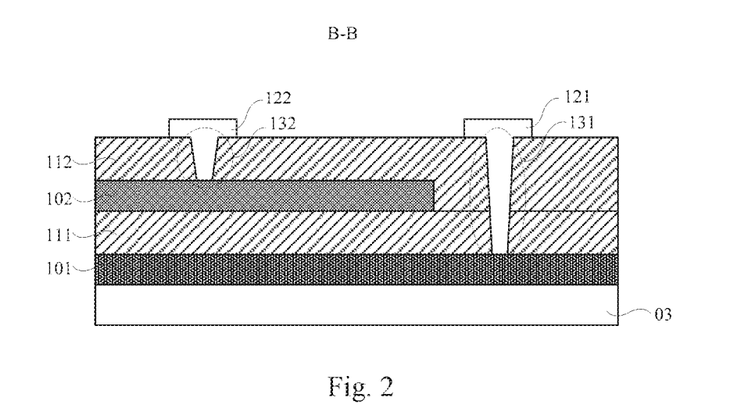
FIG. 2 is a structural schematic view taken along line B-B of FIG. 1.

As shown in FIG. 2, in the case where the array substrate includes the base substrate 03, the pad structure 10 includes a first pad electrode 101 and a second pad electrode 102 which are sequentially disposed on the base substrate 03 in a direction perpendicular to the base substrate 03 and insulated from each other.

Specifically, as shown in FIG. 2 (a cross-sectional view taken along line B-B in FIG. 1), the array substrate further includes a first insulating layer 111 between the first pad electrode 101 and the second pad electrode 102, a second insulating layer 112 covering the first insulating layer 111 and the second pad electrode 102, a first via 131 located in the first insulating layer 111 and the second insulating layer 112 and reaching the first pad electrode 101, and a second via 132 located in the second insulating layer 112 and reaching the second pad electrode 102, a first conductive electrode 121 and a second conductive electrode 122 located on the second insulating layer 112.

The first conductive electrode 121 is electrically connected to the first pad electrode 101 through the first via 131. At this time, when the driving chip is bound to the bonding region 01, one contact structure on the driving chip (not shown) is in contact with the first conductive electrode 121 in one pad structure 10 on the array substrate. Since the first pad electrode 101 is electrically connected to the data lead 20, the first pad electrode 101 and the data lead 20 constitute a first signal writing path for the driving chip to output signal, so that the signal output by the driving chip passes through the first conductive electrode 121 and enters into the first signal writing path to implement the transmission of the driving signal.

The second conductive electrode 122 is electrically connected to the second pad electrode 102 through the second via 132. At this time, when the driving chip is bound to the bonding region 01, the above contact structure on the driving chip is in contact with the second conductive electrode 122 in the above pad structure 10 on the array substrate. Since the second pad electrode 102 is electrically connected to the data lead 20, the second pad electrode 102 and the data lead 20 form a second signal writing path for the driving chip to output signal, so that the signal output by the driving chip passes through the second conductive electrode 122 and enters into the second signal writing path to implement the transmission of the driving signal.

It can be seen from the above that the first pad electrode 101 and the second pad electrode 102 are respectively in contact with the same contact structure in the above driving chip through the first conductive electrode 121 and the second conductive electrode 122 which are independent from each other, thereby enabling the first pad electrode 101 and the second pad electrode 102 being independent of each other during the signal transmission. In this case, when the first pad electrode 101 is corroded to cause the first signal writing path to be interrupted, the second signal writing path can still operate normally, thereby performing the normal transmission of the signal output from the driving chip. Alternatively, when the second pad electrode 102 is corroded to cause the second signal writing path to be interrupted, the first signal writing path can still operate normally, thereby performing the normal transmission of the signal output from the driving chip.

It should be noted that the material constituting the first conductive electrode 121 or the second conductive electrode 122 may be, for example, a transparent conductive material such as Indium Tin Oxide (ITO) or Indium Zinc Oxide (IZO), etc.

In addition, the present disclosure does not limit the number of the first via 131, the second via 132, the first conductive electrode 121 covering the first via 131, and the second conductive electrode 122 covering the second via 132. Those skilled in the art can adjust the number of the above structures according to the size of the pad structure 10 and the bonded driving chip. For example, when a length of the pad structure 10 is longer, the number of the above structures can be increased, and when the length of the pad structure 10 is shorter, the number of the above structures can be reduced.

On the basis of this, in order to not increase the number of lithography (MASK) processes during the process of manufacturing the array substrate, alternatively, when the array substrate includes gate lines and data lines, the first pad electrode 101 can be formed in the same layer as the gate line, and the second pad electrode 102 can be formed in the same layer as the data line. It should be understood that "same layer" herein refers to a layer structure formed by forming a film layer for forming a specific pattern by the same film forming process, and then forming the pattern by one patterning process using the same mask. Depending on the particular pattern, the one patterning process may include multiple exposure, development, or etching processes, and the particular pattern in the resulting layer structure may be continuous or discontinuous, and these particular patterns may also be at different heights or have different thicknesses. In this case, the manufacturing of the first pad electrode 101 can be completed while manufacturing the gate line, and the manufacturing of the second pad electrode 102 can be completed while manufacturing the data line.

Based on this, when the first pad electrode 101 is formed in the same layer as the gate line, the first insulating layer 111 is a gate insulating layer (GI), and the second insulating layer 112 is a passivation layer (PVX).

Next, an arrangement of the first pad electrode 101 and the second pad electrode 102 will be described.

In the case where an orthographic projection of the first pad electrode 101 on the base substrate 03 overlaps with an orthographic projection of the second pad electrode 102 on the base substrate 03, the arrangement of the first pad electrode 101 and the second pad electrode 102 is as follows.

Figure 3A:
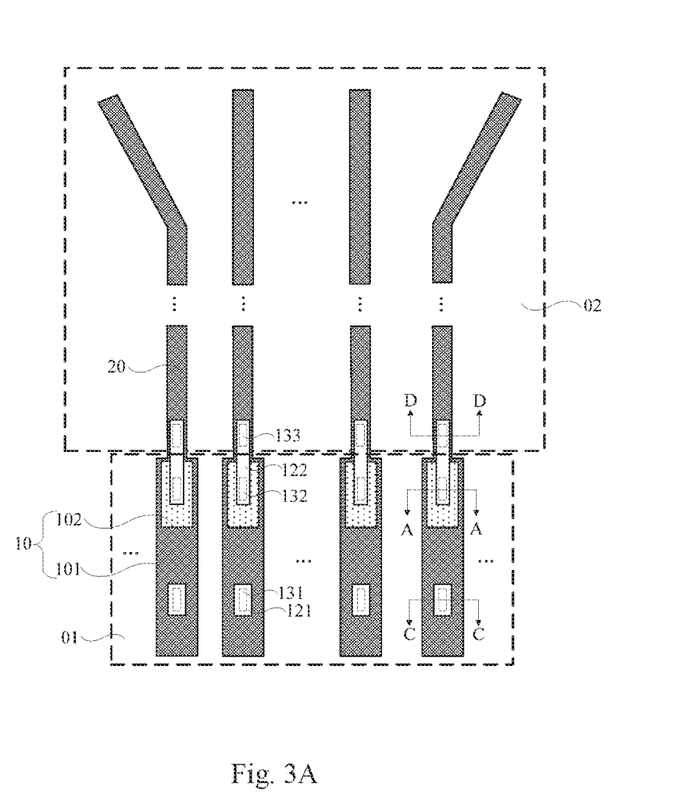
FIG. 3A is a schematic view showing a specific structure of the pad structure of FIG. 1.

As shown in FIG. 3A, an extending direction of the first pad electrode 101 is the same as an extending direction of the second pad electrode 102, and the orthographic projection of the second pad electrode 102 on the base substrate 03 only overlaps with a portion, adjacent to the lead regions 02, of the orthographic projection of the first pad electrode 101 on the base substrate 03.

Figure 3B:
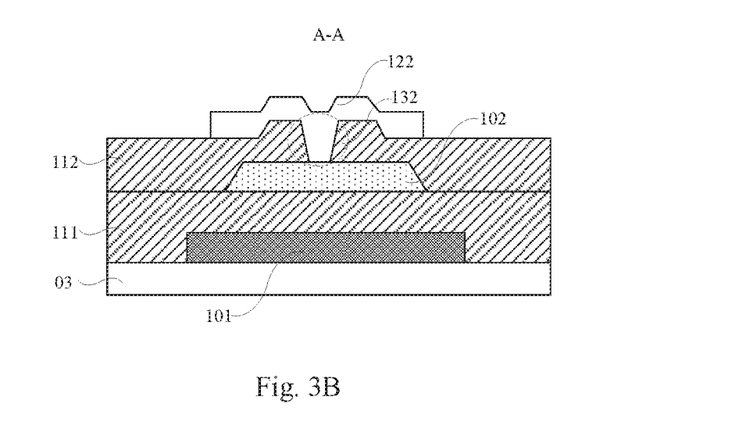
FIG. 3B is a structural schematic view taken along line A-A of FIG. 3A.

In this case, the second via 132 and the second conductive electrode 122 are provided at positions where the orthographic projection of the first pad electrode 101 on the base substrate 03 overlaps with the orthographic projection of the second pad electrode 102 on the base substrate 03. Specifically, as shown in FIG. 3B (a cross-sectional view taken along line A-A in FIG. 3A), the second via 132 passes through the second insulating layer 112, so that the second conductive electrode 122 can be electrically connected to the second pad electrode 102 through the second via 132.

Figure 3C:
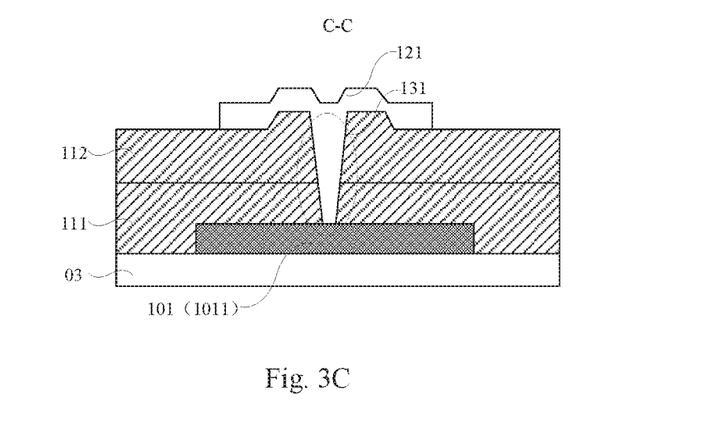
FIG. 3C is a structural schematic view taken along line C-C of FIG. 3A.

Further, the first via 131 and the first conductive electrode 121 are provided at positions where the orthographic projection of the first pad electrode 101 on the base substrate 03 does not overlap with the orthographic projection of the second pad electrode 102 on the base substrate 03. Specifically, as shown in FIG. 3C (a cross-sectional view taken along line C-C in FIG. 3A), the first via 131 passes through the first insulating layer 111 and the second insulating layer 112, so that the first conductive electrode 121 can be electrically connected to the first pad electrode 101 through the first via 131.

Based on this, one end of the first pad electrode 101 and one end of the second pad electrode 102 adjacent to the lead region 02 are both electrically connected to the data lead 20. Thereby, the data lead 20 can form an independent signal writing path with the first pad electrode 101 and the second pad electrode 102, respectively.

On the basis of this, the arrangement of the data lead 20 will be described.

For example, the data lead 20 can be a single layer wiring structure. In this case, as shown in FIG. 3A, the data lead 20 may be formed in the same layer as the first pad electrode 101. At this time, when the first pad electrode 101 is formed in the same layer as the gate line, the material of the data lead 20 is the same as the material of the gate line. Thus, the manufacturing of the first pad electrode 101 and the data lead 20 can be completed while manufacturing the gate line, and the first pad electrode 101 and the data lead 20 are an integration structure.

Based on this, since the data lead 20 is formed in the same layer as the first pad electrode 101, and the surface of the first pad electrode 101 is provided with the first insulating layer 111 and the second insulating layer 112, the surface of the data lead 20 is also provided with the first insulating layer 111 and the second insulating layer 112. In order to electrically connect the second pad electrode 102 to the data lead 20, the array substrate may further include a third via 133 located in the first insulating layer 111 and the second insulating layer 112 and reaching a portion of the data lead 20 adjacent to the bonding region 01. The above second conductive electrode 122 is also electrically connected to the data lead 20 through the third via 133. Thus, the second conductive electrode 122 electrically connects the second pad electrode 102 to the data lead 20 through the second via 132 and the third via 133, respectively.

Figure 3D:
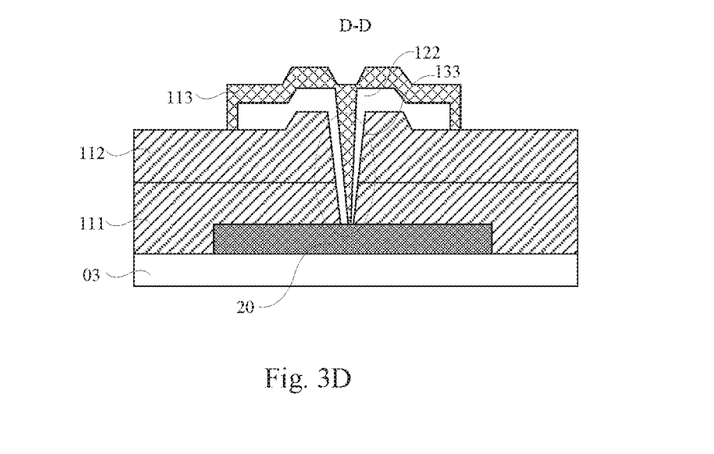
FIG. 3D is a structural schematic view taken along line D-D of FIG. 3A.

As can be seen from the above, the second via 132 is located within the bonding region 01, and the position of the upper surface of the second conductive electrode 122 corresponding to the second via 132 is covered by the driving chip bound to the bonding region 01. However, since the third via 133 is located within the lead region 02, the position of the upper surface of the second conductive electrode 122 corresponding to the third via 133 is not covered by the driving chip. Therefore, as shown in FIG. 3D, when the density of the conductive thin film layer constituting the second conductive electrode 122 is poor, the data lead 20 located at the position of the third via 133 is exposed, which is liable to cause electrochemical corrosion.

In this case, in order to prevent the data lead 20 at the position of the third via 133 from being corroded, the array substrate may further include a conductive protective layer 113 covering the second conductive electrode 122, wherein an orthographic projection of the conductive protective layer 113 on the base substrate 03 overlaps with an orthographic projection of the third via 133 on the base substrate 03, so that the data lead 20 at the position of the third via 133 can be protected. The conductive protective layer 113 may be an anisotropic conductive film (ACF). Since the ACF needs to be applied to the surface of the above pad structure 10 before bonding the driving chip, the surface of the second conductive electrode 122 at the position of the third via 133 may be also applied the ACF during the coating process, which will not add additional conductive material.

Alternatively, for example, the arrangement of the data lead 20 may be a double layer wiring structure. Specifically, as shown in FIG. 4, the data lead 20 includes a first sub-electrode 201 and a second sub-electrode 202 which overlap with each other in a direction perpendicular to the base substrate 03.

The first sub-electrode 201 is formed in the same layer as the first pad electrode 101 and connected to the first pad electrode 101. That is, the first sub-electrode 201 and the first pad electrode 101 are an integration structure. Therefore, the surface of the first sub-electrode 201 is covered with the first insulating layer 111 and the second insulating layer 112.

The second sub-electrode 202 is formed in the same layer as the second pad electrode 102 and connected to the second pad electrode 102. That is, the second sub-electrode 202 and the second pad electrode 102 are an integration structure. Therefore, the surface of the second sub-electrode 202 is covered with the second insulating layer 112.

Figure 4:
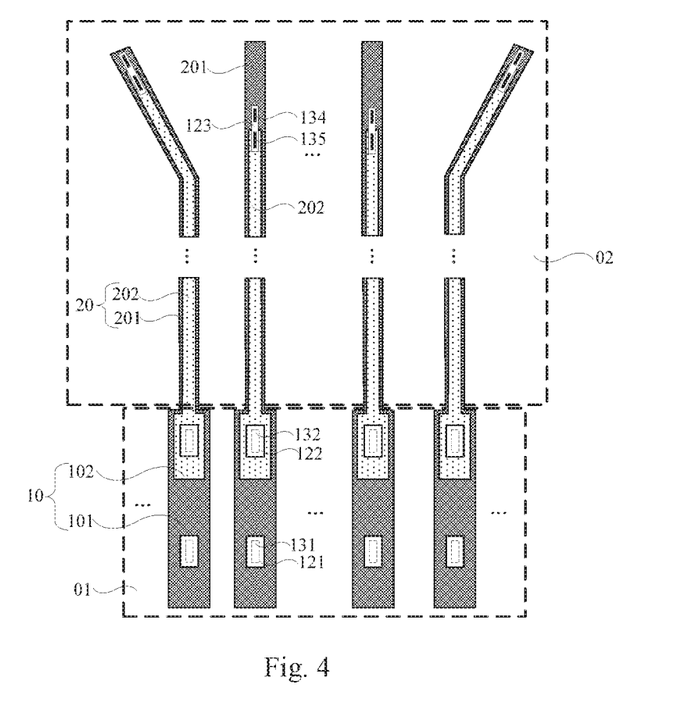
FIG. 4 is a schematic view showing a specific structure of the data lead of FIG. 1.

In this case, in order to electrically connect the first sub-electrode 201 to the second sub-electrode 202 in the lead region 02, as shown in FIG. 4, the array substrate may further include a fourth via 134 located in the first insulating layer 111 and the second insulating layer 112 and reaching a portion of the first sub-electrode 201 away from the bonding region 01. In addition, the array substrate further includes a fifth via 135 located in the second insulating layer 112 and reaching a portion of the second sub-electrode 202 away from the bonding region 01.

Based on this, the third conductive electrode 123 electrically connects the first sub-electrode 201 to the second sub-electrode 202 through the fourth via 134 and the fifth via 135.

As can be seen from the above, one end of the data lead 20 in the lead region 02 is connected to the pad structure 10 in the bonding region 01, and the other end is connected to the gate line or the data line. Taking the data lead 20 being connected to the data line as an example, as the resolution of the display panel is increased, the number of data lines is also increased. However, in order to improve the integration effect of the electronic device, the size of the driving chip is getting smaller and smaller, thus the width of the driving chip will be much smaller than the width of the display region in the array substrate.

Figure 5:
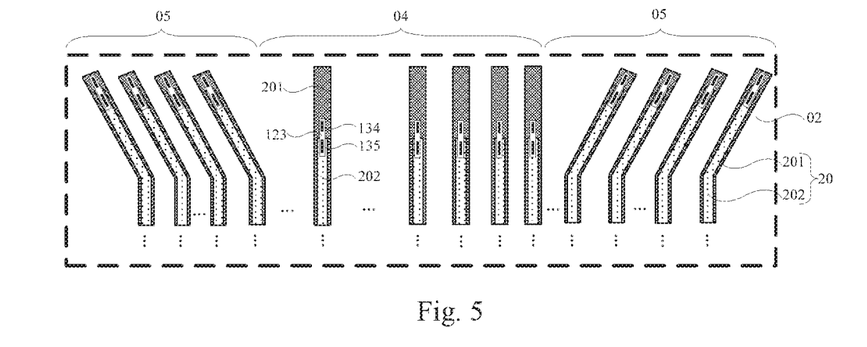
FIG. 5 is a schematic view showing the specific division structure of the lead region of FIG. 4.

In this case, in order to enable the driving chip bound to the bonding region 01 through the pad structure 10 to be connected to all the data lines, the arrangement of the data lead 20 in the lead region 02 may be as shown in FIG. 5. Specifically, the lead region 02 includes a proximal terminal region 04 located at a central position of the lead region and a distal terminal region 05 located at both sides of the proximal terminal region 04.

In this embodiment, the data lead 20 in the proximal terminal region 04 is a straight line extending in a first direction. A portion, adjacent to the bonding region 01, of the data lead 20 in the distal terminal region 05 (i.e., the lower end of the data lead 20 in FIG. 5) is a straight line extending in the first direction. A portion, away from the bonding region 01, of the data lead 20 in the distal terminal region 05 is an oblique line inclined in a direction facing away from the proximal terminal region 04. Therefore, the data lead 20 in the proximal terminal region 04 is closer to the central portion of the display region, and thus the data lead 20 is a straight line, so that the data lead 20 can be electrically connected to the data line with the shortest distance. In addition, the portion of the data lead 20 in the distal terminal region 05 is an oblique line, so as to be electrically connected to the data line at the edge of the display region.

It should be noted that the above first direction is the same as an extending direction of the signal line (not shown) connected to the data lead 20. For example, when the data lead 20 is connected to the gate line, the first direction is the same as the extending direction of the gate line. When the data lead 20 is connected to the data line, the first direction is the same as the extending direction of the data line. Alternatively, when the data lead 20 is a PLG wire, and when the PLG wire is connected to a signal line in the GOA circuit, the first direction is the same as an extending direction of the signal line in the GOA circuit.

As can be seen from the above, a length of the data lead 20 in the distal terminal region 05 is greater than a length of the data lead 20 in the proximal terminal region 04, thus the resistance of the data lead 20 in the distal terminal region 05 is greater than the resistance of the data lead 20 in the proximal terminal region 04. This will result in a delay in the driving signal output from the data lead 20 in the distal terminal region 05 to the data line as compared to the driving signal output from the data lead 20 in the proximal terminal region 04 to the data line, thereby influencing the display effect.

In order to solve the above problem, as shown in FIG. 5, the length of the second sub-electrode 202 in the proximal terminal region 04 may be smaller than the length of the second sub-electrode 202 in the distal terminal region 05. Thereby, the resistance of the data lead 20 in the distal terminal region 05 is the same as or approximately the same as the resistance of the data lead 20 in the proximal terminal region 04, so that the phenomenon that the signal transmission speed is inconsistent can be avoided.

Further, in the embodiment shown in FIG. 4 or FIG. 5, the data lead 20 has a double layer wiring structure. Compared with the single layer wiring structure in FIG. 3A, the double layer wiring structure can reduce the resistance of the data lead 20, thereby achieving the purpose of reducing power consumption.

Next, another arrangement of the first pad electrode 101 and the second pad electrode 102 will be described.

Figure 6A:
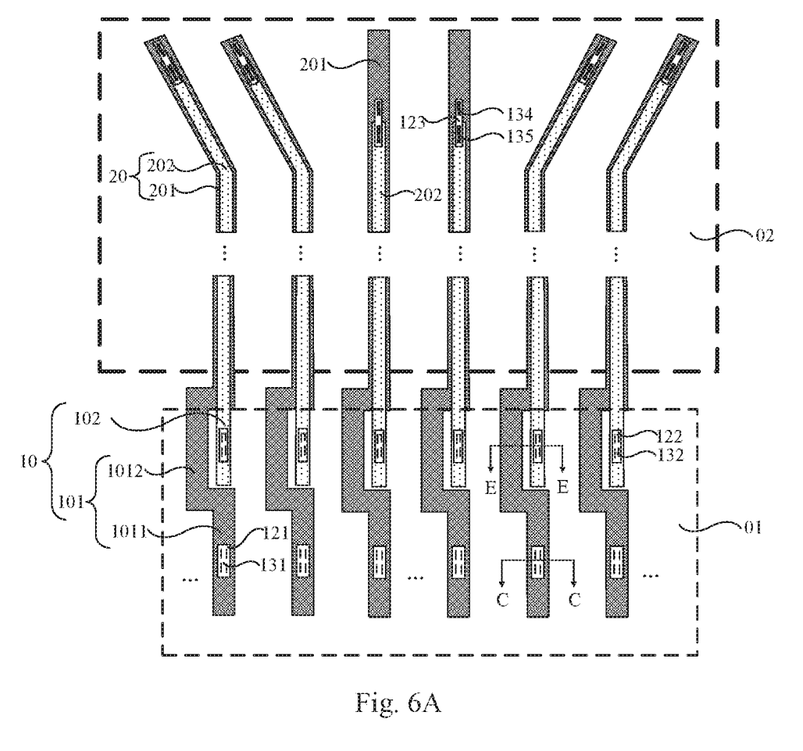
FIG. 6A is a schematic view showing another specific structure of the pad structure of FIG. 1.

As shown in FIG. 6A, the orthographic projection of the first pad electrode 101 on the base substrate 03 does not overlap with the orthographic projection of the second pad electrode 102 on the base substrate 03. The first pad electrode 101 includes a first sub-portion 1011 and a second sub-portion 1012.

In this embodiment, the first sub-portion 1011 is located at one end of the second pad electrode 102 facing away from the data lead 20. The extending direction of the first sub-portion 1011 is the same as the extending direction of the second pad electrode 102. The second sub-portion 1012 is located on a side of the second pad electrode 102 in a direction perpendicular to the extending direction. One end of the second sub-portion 1012 is connected to the first sub-portion 1011, and the other end is electrically connected to the data lead 20. At this time, the first pad electrode 101 has an arcuate shape.

Figure 6B:
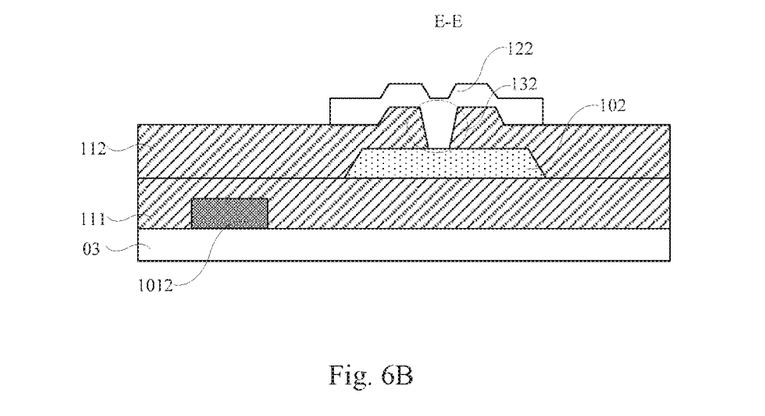
FIG. 6B is a structural schematic view taken along line E-E of FIG. 6A.

In this case, the second via 132 and the second conductive electrode 122 are disposed on the upper surface of the second pad electrode 102. Specifically, as shown in FIG. 6B (a cross-sectional view taken along line E-E in FIG. 6A), the second via 132 passes through the second insulating layer 112, so that the second conductive electrode 122 can be electrically connected to the second pad electrode 102 through the second via 132.

Further, a first via 131 and a first conductive electrode 121 are provided on the upper surface of the first sub-portion 1011 of the first pad electrode 101. Specifically, as shown in FIG. 3C (a cross-sectional view taken along line C-C in FIG. 3A), the first via 131 passes through the first insulating layer 111 and the second insulating layer 112, thereby enabling the first conductive electrode 121 to be electrically connected to the first sub-portion 1011 of the first pad electrode 101 through the first via 131.

Based on this, one end of the second pad electrode 102 adjacent to the lead region 02 is electrically connected to the data lead 20. Thereby, the data lead 20 can form an independent signal writing path together with the first pad electrode 101 and the second pad electrode 102, respectively.

In summary, as shown in FIG. 3B, the first pad electrode 101 is located directly below the second pad electrode 102. However, as shown in FIG. 6B, the second sub-portion 1012 of the first pad electrode 101 is located on the side of the second pad electrode 102. Therefore, the distance between the second conductive electrode 122 and the base substrate 03 in FIG. 6B is smaller than the distance between the second conductive electrode 122 and the base substrate 03 in FIG. 6B. Therefore, when the first pad electrode 101 and the second pad electrode 102 are configured as shown in FIG. 6A, the level difference between the second conductive electrode 122 and the first conductive electrode 121 is small, so that the flatness of the surface of the pad structure 10 being in contact with the driving chip is higher, which facilitates the bonding of the driving chip.

Further, in the case where the first pad electrode 101 and the second pad electrode 102 are configured as shown in FIG. 6A, the arrangement of the data lead 20 is as described above. For example, as shown in FIG. 6A, the data lead 20 may be a double layer wiring structure. Specifically, the data lead 20 includes a first sub-electrode 201 and a second sub-electrode 202 that overlap with each other in a direction perpendicular to the base substrate 03. The arrangement in which the first sub-electrode 201 and the second sub-electrode 202 are electrically connected is as described above, and will not be described herein.

Figure 7:
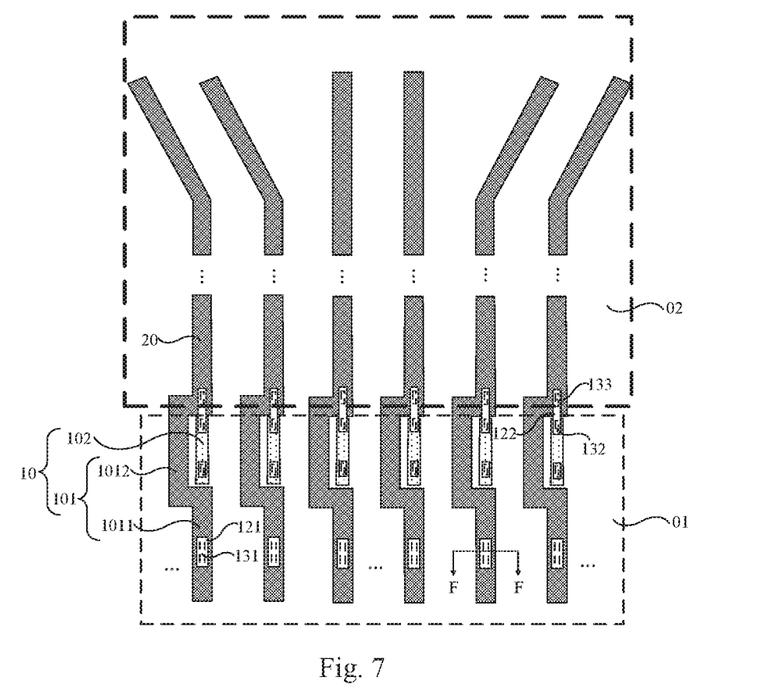
FIG. 7 is a schematic view showing another specific structure of the data lead of FIG. 1.

Alternatively, as shown in FIG. 7, the data lead 20 may be a single layer wiring structure. The data lead 20 may be formed in the same layer as the first pad electrode 101. In this case, the arrangement in which the data lead 20 and the second pad electrode 102 are electrically connected is as described above, and will not be described herein.

Embodiments of the present disclosure also provide a display apparatus including the array substrate as described above.

It should be noted that, in an embodiment of the present disclosure, the display apparatus may specifically include at least a liquid crystal display device and an organic light emitting diode display device. For example, the display apparatus can be any product or component having a display function such as a display, a television, a digital photo frame, a mobile phone, or a tablet.

Figure 8:
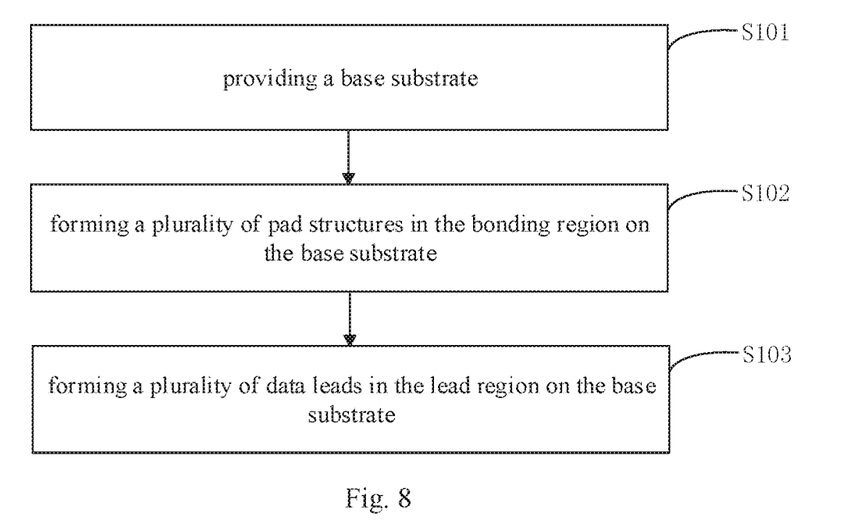
FIG. 8 is a flowchart of a method for manufacturing the array substrate according to an embodiment of the present disclosure.

Embodiments of the present disclosure also provide a method for manufacturing an array substrate as described above. As shown in FIG. 8, the method includes steps S101 to S103.

In S101, a base substrate 03 is provided.

In S102, a plurality of pad structures 10 are formed in the bonding region 01 on the base substrate 03. The pad structure 10 includes at least two pad electrodes insulated from each other.

In S103, a plurality of data leads 20 are formed in the lead region 02 on the base substrate 03. Each data lead 20 corresponds to a pad structure 10. In the pad structure 10, each pad electrode is electrically connected to the data lead 20 corresponding to the pad structure 10, respectively, to form different signal writing paths.

Thus, when one of the pad electrodes is corroded and cannot be repaired and thus operates abnormally, the other pad electrode can still maintain the normal signal transmission between the pad structure 10 and the data lead 20, thereby improving the quality of the array substrate, and reducing the risk of substrate defects and manufacturing costs.

Next, a method for manufacturing the above-described pad structure 10 will be described. Here, the structure shown in FIG. 2 is taken as an example.

Figure 9:
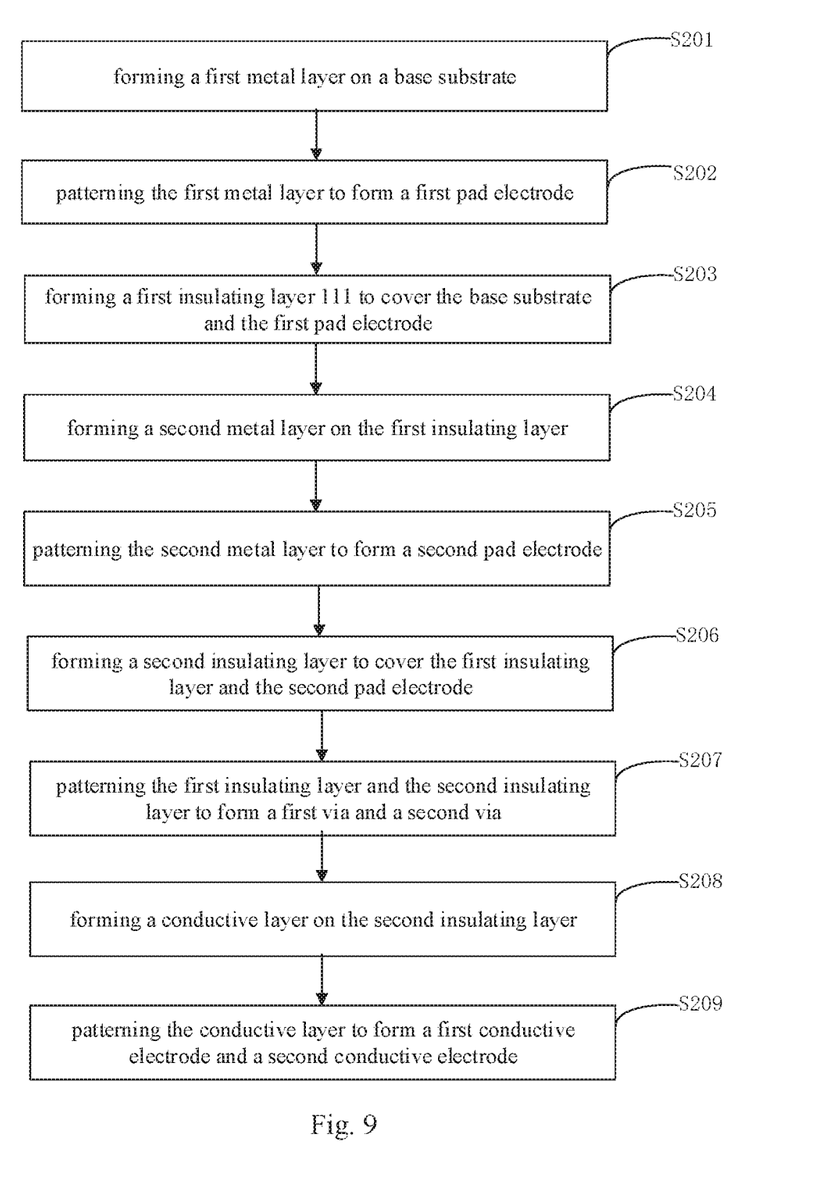
FIG. 9 is a flowchart of a specific method of step S102 in FIG. 8.

Specifically, as shown in FIG. 9, the step for forming the pad structure 10 includes S201 to S209.

Referring to FIG. 2, in S201, a first metal layer is formed on the base substrate 03.

In S202, the first metal layer is patterned to form the first pad electrode 101.

It should be noted that in the present disclosure, the patterning process may include a photolithography process, etching, or other processes, such as printing, inkjet, or the like, for forming a predetermined pattern. The photolithography process refers to a process of forming a pattern by using a photoresist, a mask, an exposure machine, or the like during a process of film formation, exposure, development, and the like. The corresponding patterning process can be selected in accordance with the structure formed in the present disclosure.

In addition, the one patterning process in the embodiment of the present disclosure specifically includes forming different exposure regions by one mask exposure process, and then performing the removal process, such as multiple etching, ashing, and the like, on different exposure regions to finally obtain a desired pattern.

In S203, a first insulating layer 111 is formed to cover the base substrate 03 and the first pad electrode 101.

In S204, a second metal layer is formed on the first insulating layer 111.

In S205, the second metal layer is patterned to form the second pad electrode 102.

It should be noted that the materials of the first metal layer and the second metal layer may be the same or different. In order to not increase the number of times of the lithography (MASK) process during the process of manufacturing the array substrate, the material of the first metal layer may be the same as the material of the gate line, and the material of the second metal layer may be the same as the material of the data line. In this case, the gate line provided in the same layer as the first pad electrode 101 may be formed in the display region while forming the above-described first pad electrode 101 by one patterning process. Further, the data line formed in the same layer as the second pad electrode 102 may be formed in the display region while forming the above-described second pad electrode 102 by one patterning process.

In S206, a second insulating layer 112 is formed to cover the first insulating layer 111 and the second pad electrode 102.

In S207, the first insulating layer 111 and the second insulating layer 112 are patterned to form a first via 131 reaching the first pad electrode 101 and a second via 132 reaching the second pad electrode 102.

In S208, a conductive layer is formed on the second insulating layer 112 to fill the first via 131 and the second via 132. In this embodiment, the conductive layer can be, for example, transparent or opaque.

In S209, the conductive layer is patterned to form the first conductive electrode 121 and the second conductive electrode 122. The first conductive electrode 121 is electrically connected to the first pad electrode 101 through the first via 131. The second conductive electrode 122 is electrically connected to the second pad electrode 102 through the second via 132.

In this case, when the driving chip is bound to the bonding region 01, the contact structure (not shown) on the driving chip is in contact with the first conductive electrode 121 in the pad structure 10 on the array substrate. Since the first pad electrode 101 is electrically connected to the data lead 20, the first pad electrode 101 and the data lead 20 constitute a first signal writing path for the driving chip to output signal, so that the signal output by the driving chip passes through the first conductive electrode 121 and enters into the first signal writing path to implement the transmission of the driving signal.

In addition, the contact structure on the driving chip is in contact with the second conductive electrode 122 in the pad structure 10 on the array substrate. Since the second pad electrode 102 is electrically connected to the data lead 20, the second pad electrode 102 and the data lead 20 constitute a second signal writing path for the driving chip to output signal, so that the signal output by the driving chip passes through the second conductive electrode 122 and enters into the second signal writing path to implement the transmission of the driving signal.

It can be seen from the above that the first pad electrode 101 and the second pad electrode 102 are respectively in contact with the same contact structure in the driving chip through the first conductive electrode 121 and the second conductive electrode 122 which are independent of each other, thereby enabling the first pad electrode 101 and the second pad electrode 102 being independent of each other during the signal transmission. In this case, when the first pad electrode 101 is corroded to cause the first signal writing path to be interrupted, the second signal writing path can still operate normally, thereby performing the normal transmission of the signal output from the driving chip. Alternatively, when the second pad electrode 102 is corroded to cause the second signal writing path to be interrupted, the first signal writing path can still operate normally, thereby performing the normal transmission of the signal output from the driving chip.

Based on this, as shown in FIG. 4, the orthographic projection of the first pad electrode 101, formed by the above method, on the base substrate 03 may overlap with the orthographic projection of the second pad electrode 102, formed by the above method, on the base substrate 03. Alternatively, as shown in FIG. 6A, the orthographic projection of the first pad electrode 101 on the base substrate 03 may not overlap with the orthographic projection of the second pad electrode 102 on the base substrate 03.

Based on this, the method for forming the data lead 20 will be described below.

In one aspect, the data lead 20 can be a single layer wiring structure. In this case, the method for forming the data lead 20 is as follows.

Referring to FIG. 3A or FIG. 7, first, while forming the first pad electrode 101, the data leads 20 formed in the same layer as the first pad electrode 101 and connected to the first pad electrode 101 is formed.

Next, while forming the first via 131, a third via 133 reaching a portion of the data lead 20 adjacent to the bonding region 01 is formed in the first insulating layer 111 and the second insulating layer 112. The second conductive electrode is also electrically connected to the data lead 20 through the third via 133.

On the other hand, the data lead 20 can be a double layer wiring structure. In this case, the method for forming the data lead 20 is as follows.

Referring to FIG. 4 or FIG. 6A, first, while forming the first pad electrode 101, the first sub-electrode 201 of the data lead 20 formed in the same layer as the first pad electrode 101 and connected to the first pad electrode 101 is formed.

Next, while forming the second pad electrode 102, the second sub-electrode 202 of the data lead 20 formed in the same layer as the second pad electrode 102 and connected to the second pad electrode 102 is formed.

Next, while forming the first via 131, a fourth via 134 reaching a portion of the first sub-electrode 201 away from the bonding region 01 is formed in the first insulating layer 111 and the second insulating layer 112 and a fifth via 135 reaching a portion of the second sub-electrode 202 away from of the bonding region 01 are formed.

Next, while forming the first conductive electrode 121 and the second conductive electrode 122, the third conductive electrode 123 is formed on the second insulating layer 112. The third conductive electrode 123 electrically connects the first sub-electrode 201 to the second sub-electrode 202 through the fourth via 134 and the fifth via 135. The first sub-electrode 201 and the second sub-electrode 202 constitute the above-described data lead 20.

It should be noted that the beneficial effects when the data lead 20 adopts the above-mentioned single layer structure and the above-mentioned double layer structure, and the arrangement of the length of the double layer wire in the proximal terminal region 04 and the distal terminal region 05 of the lead region 02 are the same as described above, which will not described herein.

The above description is only the specific embodiment of the present disclosure, but the scope of the present disclosure is not limited thereto. Any person skilled in the art can easily think of changes or substitutions within the technical scope of the disclosure which should be included within the scope of protection of the present disclosure. Therefore, the scope of protection of the present disclosure should be determined by the scope of the claims.

What is claimed is:

1. An array substrate comprising a plurality of pad structures located in a bonding region and a plurality of data leads located in a lead region, each data lead corresponding to one pad structure,
wherein the pad structure comprises at least two pad electrodes insulated from each other, and in the pad structure, each pad electrode is electrically connected to the data lead corresponding to the pad structure, respectively, to form different signal writing paths,
wherein the array substrate further comprises a base substrate, and the at least two pad electrodes comprise a first pad electrode and a second pad electrode sequentially disposed on the base substrate in a direction perpendicular to the base substrate and insulated from each other, and
wherein the array substrate further comprises:
a first insulating layer located between the first pad electrode and the second pad electrode;
a second insulating layer covering the first insulating layer and the second pad electrode;
a first via located in the first insulating layer and the second insulating layer and reaching the first pad electrode and a second via located in the second insulating layer and reaching the second pad electrode; and
a first conductive electrode and a second conductive electrode located on the second insulating layer, wherein the first conductive electrode is electrically connected to the first pad electrode through the first via, and wherein the second conductive electrode is electrically connected to the second pad electrode through the second via.

2. The array substrate according to claim 1, wherein an extending direction of the first pad electrode is the same as an extending direction of the second pad electrode, wherein an orthographic projection of the second pad electrode on the base substrate overlaps with a portion, adjacent to the lead region, of an orthographic projection of the first pad electrode on the base substrate, and wherein one end of the first pad electrode and one end of the second pad electrode adjacent to the lead region are both electrically connected to the data lead.

3. The array substrate according to claim 1, wherein an orthographic projection of the first pad electrode on the base substrate does not overlap with an orthographic projection of the second pad electrode on the base substrate,
    wherein the first pad electrode comprises a first sub-portion and a second sub-portion, wherein the first sub-portion is located at one end of the second pad electrode facing away from the data lead, wherein an extending direction of the first sub-portion is the same as the extending direction of the second pad electrode, wherein the second sub-portion is located on a side of the second pad electrode in a direction perpendicular to the extending direction, wherein one end of the second sub-portion is connected to the first sub-portion, and wherein the other end of the second sub-portion is electrically connected to the data leads, and
    wherein one end of the second pad electrode adjacent to the lead region is electrically connected to the data lead.

4. The array substrate according to claim 1, wherein the data lead is formed in the same layer as the first pad electrode, and wherein the array substrate further comprises a third via located in the first insulating layer and the second insulating layer and reaching a portion of the data lead adjacent to the bonding region, wherein the second conductive electrode is also electrically connected to the data lead through the third via.

5. The array substrate according to claim 1, wherein the data lead comprises a first sub-electrode and a second sub-electrode, wherein an orthographic projection of the first sub-electrode on the base substrate overlaps with an orthographic projection of the second sub-electrode on the base substrate, wherein the first sub-electrode is formed in the same layer as the first pad electrode and is connected to the first pad electrode, and wherein the second sub-electrode is formed in the same layer as the second pad electrode and is connected to the second pad electrode,
    wherein the array substrate further comprises:
        a fourth via located in the first insulating layer and the second insulating layer and reaching a portion of the first sub-electrode away from the bonding region;
        a fifth via located in the second insulating layer and reaching a portion of the second sub-electrode away from the bonding region; and
        a third conductive electrode located on the second insulating layer, wherein the third conductive electrode electrically connects the first sub-electrode to the second sub-electrode through the fourth via and the fifth via.

6. The array substrate according to claim 5, wherein the lead region comprises a proximal terminal region at a central position and a distal terminal region at both sides of the proximal terminal region,
    wherein the data lead located in the proximal terminal region is a straight line extending in a first direction,
    wherein a portion of the data lead located in the distal terminal region adjacent to the bonding region is a straight line extending in the first direction, and a portion of the data lead in the distal terminal region away from the bonding region is an oblique line inclined in a direction facing away from the proximal terminal region, the first direction is the same as an extending direction of a signal line connected to the data lead, and
    wherein a length of the second sub-electrode located in the proximal terminal region is smaller than a length of the second sub-electrode located in the distal terminal region.

7. The array substrate according to claim 1, further comprising a gate line and a data line, wherein the gate line is formed in the same layer as the first pad electrode, and wherein the data line is formed in the same layer as the second pad electrode.

8. The array substrate according to claim 4, further comprising a conductive protective layer covering the second conductive electrode, wherein an orthographic projection of the conductive protective layer on the base substrate overlaps with an orthographic projection of the third via on the base substrate.

9. A display apparatus comprising the array substrate according to claim 1.

10. A method for manufacturing the array substrate according to claim 1, the method comprising:
    providing a base substrate comprising the bonding region and the lead region;
    forming the plurality of pad structures in the bonding region on the base substrate, wherein the pad structure comprises at least two pad electrodes insulated from each other; and
    forming the plurality of data leads in the lead region on the base substrate, wherein each data lead corresponds to one pad structure, and in the pad structure, each pad electrode is electrically connected to the data lead corresponding to the pad structure, respectively, to form different signal writing paths,
    wherein the method for forming the pad structure comprises:
        forming a first metal layer on the base substrate;
        patterning the first metal layer to form a first pad electrode;
        forming a first insulating layer to cover the base substrate and the first pad electrode;
        forming a second metal layer on the first insulating layer;
        patterning the second metal layer to form a second pad electrode;
        forming a second insulating layer to cover the first insulating layer and the second pad electrode;
        patterning the first insulating layer and the second insulating layer to form a first via reaching the first pad electrode and a second via reaching the second pad electrode;
        forming a conductive layer on the second insulating layer to fill the first via and the second via; and
        patterning the conductive layer to form a first conductive electrode and a second conductive electrode, wherein the first conductive electrode is electrically connected to the first pad electrode through the first via, and wherein the second conductive electrode is electrically connected to the second pad electrode through the second via.

11. The method according to claim 10, wherein the method for forming the data lead comprises:

forming the data lead formed in the same layer as the first pad electrode and connected to the first pad electrode while forming the first pad electrode; and forming a third via reaching a portion of the data lead adjacent to the bonding region in the first insulating layer and the second insulating layer while forming the first via, wherein the second conductive electrode is also electrically connected to the data lead through the third via.

12. The method according to claim 10, wherein the method for forming the data lead comprises:

forming a first sub-electrode of the data lead formed in the same layer as the first pad electrode and connected to the first pad electrode while forming the first pad electrode;

forming a second sub-electrode of the data lead formed in the same layer as the second pad electrode and connected to the second pad electrode while forming the second pad electrode;

forming a fourth via reaching a portion of the first sub-electrode away from the bonding region and a fifth via reaching a portion of the second sub-electrode away from the bonding region in the first insulating layer and the second insulating layer while forming the first via and the second via; and forming a third conductive electrode on the second insulating layer while forming the first conductive electrode and the second conductive electrode, wherein the third conductive electrode electrically connects the first sub-electrode to the second sub-electrode through the fourth via and the fifth via, the first sub-electrode and the second sub-electrode constitute the data lead.

13. The method according to claim 10, further comprising forming a gate line and a data line in a display region of the array substrate, wherein the gate line is formed in the same layer as the first pad electrode in the display region while forming the first pad electrode, and wherein the data line is formed in the same layer as the second pad electrode in the display region while forming the second pad electrode.

14. The array substrate according to claim 2, wherein the data lead comprises a first sub-electrode and a second sub-electrode, an orthographic projection of the first sub-electrode on the base substrate overlaps with an orthographic projection of the second sub-electrode on the base substrate, the first sub-electrode is formed in the same layer as the first pad electrode and is connected to the first pad electrode, and the second sub-electrode is formed in the same layer as the second pad electrode and is connected to the second pad electrode;

wherein the array substrate further comprises a fourth via located in the first insulating layer and the second insulating layer and reaching a portion of the first sub-electrode away from the bonding region;

wherein a fifth via located in the second insulating layer and reaching a portion of the second sub-electrode away from the bonding region; and wherein a third conductive electrode located on the second insulating layer, wherein the third conductive electrode electrically connects the first sub-electrode to the second sub-electrode through the fourth via and the fifth via.

15. The array substrate according to claim 14, wherein the lead region comprises a proximal terminal region at a central position and a distal terminal region at both sides of the proximal terminal region, wherein the data lead located in the proximal terminal region is a straight line extending in a first direction, wherein a portion of the data lead located in the distal terminal region adjacent to the bonding region is a straight line extending in the first direction, and a portion of the data lead in the distal terminal region away from the bonding region is an oblique line inclined in a direction facing away from the proximal terminal region, the first direction is the same as an extending direction of a signal line connected to the data lead, and wherein a length of the second sub-electrode located in the proximal terminal region is smaller than a length of the second sub-electrode located in the distal terminal region.

16. The array substrate according to claim 3, wherein the data lead comprises a first sub-electrode and a second sub-electrode, an orthographic projection of the first sub-electrode on the base substrate overlaps with an orthographic projection of the second sub-electrode on the base substrate, the first sub-electrode is formed in the same layer as the first pad electrode and is connected to the first pad electrode, and the second sub-electrode is formed in the same layer as the second pad electrode and is connected to the second pad electrode;

wherein the array substrate further comprises a fourth via located in the first insulating layer and the second insulating layer and reaching a portion of the first sub-electrode away from the bonding region;

wherein a fifth via located in the second insulating layer and reaching a portion of the second sub-electrode away from the bonding region; and wherein a third conductive electrode located on the second insulating layer, wherein the third conductive electrode electrically connects the first sub-electrode to the second sub-electrode through the fourth via and the fifth via.

17. The array substrate according to claim 16, wherein the lead region comprises a proximal terminal region at a central position and a distal terminal region at both sides of the proximal terminal region, wherein the data lead located in the proximal terminal region is a straight line extending in a first direction, wherein a portion of the data lead located in the distal terminal region adjacent to the bonding region is a straight line extending in the first direction, and a portion of the data lead in the distal terminal region away from the bonding region is an oblique line inclined in a direction facing away from the proximal terminal region, the first direction is the same as an extending direction of a signal line connected to the data lead, and wherein a length of the second sub-electrode located in the proximal terminal region is smaller than a length of the second sub-electrode located in the distal terminal region.

18. The method according to claim 11, further comprising forming a gate line and a data line in a display region of the array substrate, wherein the gate line is formed in the same layer as the first pad electrode in the display region while forming the first pad electrode, and wherein the data line is formed in the same layer as the second pad electrode in the display region while forming the second pad electrode.

* * * * *